ns.

3,341,407
METHOD FOR CONTROLLING INSECTS AND WORMS WITH ORGANOPHOSPHORUS CYCLIC SULFONE COMPOSITIONS
Sheldon B. Greenbaum, Tonawanda, N.Y., assignor to Hooker Chemical Corporation, Niagara Falls, N.Y., a corporation of New York
No Drawing. Filed Nov. 30, 1964, Ser. No. 414,886
8 Claims. (Cl. 167—33)

This is a continuation-in-part of my copending application S.N. 165,025, filed Jan. 8, 1962, now U.S. Patent 3,228,964.

This invention relates to novel organophosphorus derivatives of cyclic sulfones useful as pesticides, pesticide intermediates and as organic intermediates generally. More particularly, this invention describes new organophosphorus derivatives of cyclic alkylmercapto sulfones having contact and systemic toxicity toward insects.

The compositions of this invention have the structure:

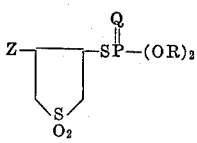

where R is an alkyl radical; where Q is oxygen or sulfur; and where Z is alkylmercapto, substituted alkylmercapto, arylmercapto, substituted arylmercapto, alkoxy, substituted alkoxy, aryloxy, or substituted aryloxy. The alkyl radicals or groups herein may have from one to eight carbon atoms, branched or unbranched, and are preferably methyl, ethyl, propyl or isopropyl, and may be a mixture of such substituents. Examples of substituents for the alkyl or aryl mercapto or oxyradicals are nitroarylmercapto, chlorinated alkylmercapto, chlorinated arylmercapto, nitroaryloxy, chlorinated alkyloxy, chlorinated aryloxy, and the like.

Examples of the novel compositions of this invention include but are not limited to the following compounds:

O,O-diethyl S-(4-methylmercapto-1,1-dioxotetrahydro-3-thienyl)phosphorothioate;
O,O-diethyl S-(4-ethylmercapto-1,1-dioxotetrahydro-3-thienyl)phosphorothioate;
O,O-diethyl S-(4-isopropylmercapto-1,1-dioxotetrahydro-3-thienyl)phosphorothioate;
O,O-diethyl S-(4-ethoxy-1,1-dioxotetrahydro-3-thienyl)phosphorothioate;
O,O-diethyl S-(4-phenoxy-1,1-dioxotetrahydro-3-thienyl)phosphorothioate;
O,O-diethyl S-(4-nitrophenoxy-1,1-dioxotetrahydro-3-thienyl)phosphorothioate;
O,O-diethyl S-(4-nitrophenylmercapto-1,1-dioxotetrahydro-3-thienyl)phosphorothioate;
O,O-diethyl S-(4-chlorophenoxy-1,1-dioxotetrahydro-3-thienyl)phosphorothioate;
O,O-diethyl S-(4-chlorophenylmercapto-1,1-dioxotetrahydro-3-thienyl)phosphorothioate;
O,O-diethyl S-(4-chloro-1,1-dioxotetrahydro-3-thienyl)phosphorothioate;
O,O-dimethyl S-(4-methylmercapto-1,1-dioxotetrahydro-3-thienyl)phosphorothioate;
O,O-dimethyl S-(4-ethylmercapto-1,1-dioxotetrahydro-3-thienyl)phosphorothioate;
O,O-dimethyl S-(4-isopropylmercapto-1,1-dioxotetrahydro-3-thienyl)phosphorothioate;
O,O-dimethyl S-(4-ethoxy-1,1-dioxotetrahydro-3-thienyl)phosphorothioate;
O,O-dimethyl S-(4-phenoxy-1,1-dioxotetrahydro-3-thienyl)phosphorothioate;
O,O-dimethyl S-(4-nitrophenoxy-1,1-dioxotetrahydro-3-thienyl)phosphorothioate;
O,O-dimethyl S-(4-nitrophenylmercapto-1,1-dioxotetrahydro-3-thienyl)phosphorothioate;
O,O-dimethyl S-(4-chlorophenoxy-1,1-dioxotetrahydro-3-thienyl)phosphorothioate;
O,O-dimethyl S-(4-chlorophenylmercapto-1,1-dioxotetrahydro-3-thienyl)phosphorothioate;
O,O-dimethyl S-(4-methylmercapto-1,1-dioxotetrahydro-3-thienyl)phosphorodithioate;
O,O-diethyl S-(4-methylmercapto-1,1-dioxotetrahydro-3-thienyl)phosphorodithioate; and the like Common intermediates to these above named compounds are O,O-diethyl and O,O-dimethyl S-(4-chloro-1,1-dioxotetrahydro-3-thienyl)phosphorothioate, which are also new compositions of matter.

The terms "insecticide" and "insect" as used herein refer to their broad and commonly understood usage rather than to those creatures which in the strict biological sense are classified as insects. Thus, the term "insect" is used not only to include those small invertebrate animals belonging mostly to the class insects, comprising six-legged, usually-winged forms such as beetles, bugs, bees, flies and so forth, but also to other allied classes of orthropods whose members are wingless and may or have more or fewer than six legs, such as spiders, mites, ticks, centipedes, worms, nematodes and the like.

The novel organophosphorus derivatives of cyclic sulfones of this invention offer several unexpected advantages over comparable or related compositions of the prior art. For example, the compositions of this invention are potent contact and systemic insecticides at low levels of concentration. Thus the material can be applied to the root areas of plants and by absorption into the plants through the roots, the pests are controlled through contact with the plants. A specific method of systemic control is in the coating of seeds with the compounds of this invention prior to planting, and then allowing the seeds to germinate. In this way the pesticide is absorbed into the seedling. Furthermore, this insecticidal activity persists for long periods of time after application. That these structures are insecticidal at all is both unexpected and surprising in view of the relative inactivity as insecticides of those compounds wherein Z is hydrogen rather than any of the designated substituents. The fact that the presence of this hydrogen atom on this position of the molecule deactivates the compounds as insecticides is unusual in view of the published literature. The activity of the compositions at these very low concentrations, particularly as contact insecticides, is most advantageous. This level of activity offers the obvious advantage of low cost use, as well as reducing the danger of mammalian toxicity.

An additional important advantage of the inventive compositions as insecticides is that they possess an unusually broad spectrum of activity. That is, the compositions are toxic to a wide variety of insects including but not limited to flies, mosquitoes, roaches, beetles, silverfish, aphids, and mites. Many of the related compositions of the prior art are so specific in their insecticidal activity as to require the use of other insecticides to control the normal insect population encountered. This shortcoming makes the prior art insecticides commercially unsuitable. By contrast, the compositions of this invention are especially suitable for crop and garden use where many different species of insects are commonly encountered.

An additional advantage of these novel compositions is that they may be utilized as pesticides in various grades of purity, ranging from a crude reaction mixture up to a highly refined product. Furthermore, these compositions may be combined with other pesticides, for example, insecticides, such as DDT, methoxychlor, lindane, aldrin, endrin, DDD, BHC, parathion, malathion, methyl parathion, lead and other metallic arsenates, rotenone, allethrin, pyrethrum, nicotine, summer oils, dormant oils, petroleum fractions and distillates, dinitroalkylphenols, dinitrocresols, chlordane, heptachlor, chlorinated terpenes, demeton, other insecticidal organophosphates, thiophosphates and dithiophosphates such as those commercially designed as Guthion, Diazinon, Dibrom and others; miticides such as bis (pentachlorocyclopentadienyl), chlorinated arysulfonates, quinoxaline trithiocarbonates, chlorinated diarysulfones and the like, fungicides such as sulfur, dithiocarbamates and N-trichloromethylthio-4-cyclohexene-1,2-dicarboximide to list but a few.

It is also desirable to combine the insecticidal products of this invention with a class of potentiators or synergists known in the insecticidal art as "knockdown agents." These substances are materials which may or may not be insecticidal themselves, but which when combined with other insecticides will shorten the time required, or reduce the amounts of the insecticide necessary to effect total immobilization (knockdown) or death of the insect to be controlled. Among the large number of synergists which may be used for this purpose are the organic thiocyanates and the water-soluble organophosphates, such as Phosdrin and "Sesoxane" [2-(3,4-methylenedioxyphenoxy)-3,6,9-trioxaudecane], among others.

Yet another advantage of the inventive compositions is that they may readily be formulated as solids or liquids using solid or liquid solvents, vehicles, carriers or extenders.

Suitable diluents are solids or liquids of an inert nature. Illustrative solid dileunts include among many others: sawdust, clay, flours, silicas, alkaline earth carbonates, oxides and phosphates, sulfur and the like.

Suitable solvents for liquid formulations include ketones, alcohols, aromatic hydrocarbons, aliphatic hydrocarbons, and petroleum fractions or distillates. Solutions in solvents such as these may be further dispersed in water by use of emulsifiers.

Whether dissolved or dispersed, suspended or emulsified in a liquid or formulated as a dust or powder or some other solid preparation, the insecticides of this invention may advantageously contain one or more substances known or referred to variously as modifiers, wetting agents, surface active agents, dispersing agents, suspending agents, emulsifying agents or conditioning agents, said materials being referred to herein generically as adjuvants. Thus, any substance which facilitates formulation, handling and application of the insecticide of this invention may be profitably incorporated in the insecticidal composition. Frequently, said adjuvants enhance or potentiate insecticidal effectiveness. A satisfactory but not exhaustive list of these substances appears among other places in "Soap and Chemical Specialists," volume 31; No. 7, pages 50–61; No. 8, pages 48–61; No. 9, pages 52–67 and No. 10, pages 38–67 (1955). Another source of this information is Bulletin E–607 of the Bureau of Entomology and Plant Quarantine of the United States Department of Agriculture.

The insecticidal compositions of this invention may be applied as a dust or a spray using among other things, any of the above-mentioned exemplified formulations.

The preferred method of application is a spray using petroleum fractions or distillates as diluents plus one or more conditioning agents as formulation adjuvants. Ordinarily, a typical spray will contain between about 0.001 percent and about ten percent by weight of insecticide with the remaining material being made up largely of solvent with a small amount of adjuvant.

In its process aspects, this invention offers the advantage of two different economically feasible processes for preparing most of the compositions of this invention in good yield from commercially available starting materials. One process involves reacting 3-sulfolene (2,5-dihydrothiophene-1,1-dioxide) with an alkyl or aryl sulfenyl halide and then treating the resulting 3-halo heterocyclic with the metal or ammonium salt of a dilower alkyl phosphorothioate or dithioate. The general reactions for this first process are set forth in Equations 1 and 2 below:

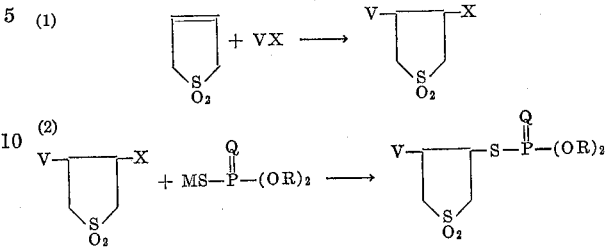

where R is an alkyl radical; where Q is oxygen or sulfur; where M is a metal or ammonium cation; where X is halogen, preferably chlorine; and where V is alkylmercapto, substituted alkylmercapto, arylmercapto, or substituted arylmercapto.

Another means of preparing the compositions of this invention (where Q equals oxygen), involves reacting 3-sulfolene with a dialkoxyphosphinyl sulfenyl halide, then treating the resultant 4-halo-3-dialkoxyphosphinyl-thiotetrahydrothienyl-1,1-dioxide with a metal or ammonium mercaptide or alkoxide. The general reactions of this second process are set forth in Equations 3 and 4 below:

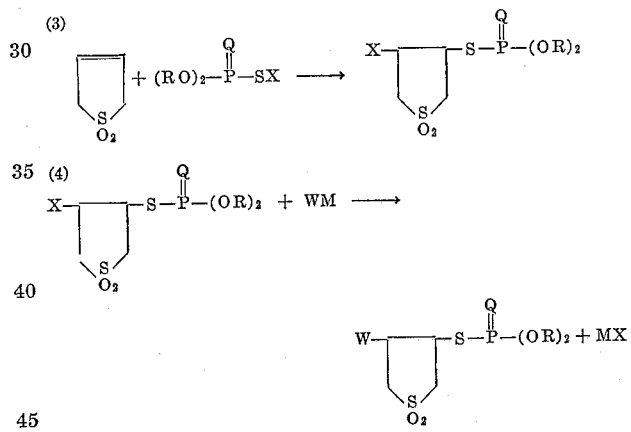

where R is an alkyl radical; where M is a metal or ammonium cation; where X is halogen, preferably chlorine; and where W is alkylmercapto, substituted alkyl mercapto, aryl mercapto, substituted aryl mercapto, alkoxy, substituted alkoxy, aryloxy, or substituted aryloxy.

The reactions of both process proceed readily at relatively wide ranges of temperatures, zero degrees to two hundred degrees centigrade, depending upon the reactivity of the various reactants used. Where both reactants are liquids, it is possible to run the reactions without using diluents; although diluents such as inert aromatic or aliphaitc hydrocarbons, ketones or alcohols make for smoother reactions.

EXAMPLE 1.—PREPARATION OF O,O-DIETHYL S-(4-CHLORO-1,1-DIOXOTETRAHYDRO-3-THIENYL) PHOSPHIROTHIOATE

A mixture of 11.8 grams of 2,5-dihydrothiophene-1,1-dioxide (sulfolene) and forty milliliters of carbon tetrachloride is treated dropwise with 20.5 grams of diethoxyphosphinyl sulfenyl chloride at room temperature. (The sulfenyl chloride was prepared according to the directions of Michalski et al., Chemistry and Industry, page 1199 (1958).) The sulfolene is relatively insoluble in the solvent at the start of the reaction. A one milliliter aliquot of supernatant fluid produces the equivalent of 10.8 milliliter of 0.1 N iodine from potassium iodide. The mixture is heated at reflux overnight and after cooling and removing the small amount of sulfolene remaining, one milliliter of the filtrate produces the equivalent of only 0.25 milliliter of 0.1 N iodine showing substantial completion of the reaction. The filtrate is reduced to dryness, the residue is taken up in benzene, washed with five percent sodium bicarbonate and again reduced to dryness to give a yellow oil.

*Analysis.*—Calcd. for $C_8H_{16}ClO_5PS_2$: P, 9.7 percent; Cl, 10.9 percent. Found: P, 10.0 percent; Cl, 11.0 percent.

This compound, O,O-diethyl S-(4-chloro-1,1-dioxotetrahydro-3-thienyl)phosphorothioate, is believed to be a new composition of matter as will be seen in the examples and disclosure which follows. It is useful as an intermediate for organic synthesis, especially for the preparation of pesticides. It may also be useful as an oil additive.

EXAMPLE 2.—PREPARATION OF O,O-DIETHYL S-(4-ETHYLMERCAPTO - 1,1 - DIOXOTETRAHYDRO-3-THIENYL) PHOSPHOROTHIOATE

A solution of one part of sodium in fifty parts of absolute ethanol is treated with 2.73 parts of ethyl mercaptan. This, in turn, is added to a solution of fourteen parts of the product of Example 1 in an additional fifty parts of ethanol at a temperature below five degrees. After eight hours of standing at room temperature, the solution has reached neutrality, and the salt produced can be removed by filtration. The filtrate is reduced to dryness and then taken up in three volumes of benzene. This benzene extract is washed three times with water and dried over anhydrous magnesium sulfate. Removal of the solvent under good vacuum gives an oil of sufficient purity for insecticidal testing.

*Analysis.*—Calcd. for $C_{10}H_{21}O_5PS_3$: P, 8.9 percent; S, 27.6 percent. Found: P, 9.1 percent; S, 28.0 percent.

EXAMPLE 3.—PREPARATION OF O,O-DIETHYL S - (4 - ETHOXY - 1,1 - DIOXOTETRAHYDRO - 3- THIENYL) PHOSPHOROTHIOATE

A solution of one part of sodium in fifty parts of absolute alcohol is added to a solution of fourteen parts of the product in Example 1 in fifty parts of ethanol at a temperature below five degrees. After the solution has stood for three hours, it is then heated to reflux until the reaction is complete. (A small sample diluted with an equal volume of water tests neutral to pH paper.) The solution is cooled, freed of salt by filtration and freed of solvent under reduced pressure. Distillation of the yellow oil under reduced pressure gives a neutral oil of boiling point one hundred and twenty degrees at 0.0015 millimeter.

*Analysis.*—Calcd. for $C_{10}H_{21}O_6PS_2$: P, 9.4 percent; S, 19.3 percent. Found: P, 9.2 percent; S, 19.7 percent.

EXAMPLE 4.—PREPARATION OF O,O-DIETHYL S-(4-METHYLMERCAPTO - 1,1 - DIOXOTETRAHYDRO-3-THIENYL) PHOSPHOROTHIOATE

A solution of one part of sodium in fifty parts of methanol is treated with gaseous methyl mercaptan until the reaction is complete. This, in turn is added to a solution of fourteen parts of the product of Example 1, in an additional fifty parts of methanol at a temperature below five degrees. After eight hours of standing the solution is neutral and the salt produced is removed by filtration. The filtrate is reduced to dryness and then taken up in three volumes of benzene. The extract is washed three times with water and dried over anhydrous magnesium sulfate. Removal of the solvent under good vacuum gives an oil of sufficient purity for insecticidal testing.

*Analysis.*—Calcd. for $C_9H_{19}O_5PS_3$: P, 9.3 percent; S, 28.8 percent. Found: P, 9.5 percent; S, 29.1 percent.

EXAMPLE 5.—PREPARATION OF O,O-DIETHYL S - (4 - PHENOXY - 1,1 - DIOXOTETRAHYDRO-3-THIENYL) PHOSPHOROTHIOATE

A mixture of one part of sodium phenolate, 2.75 parts of the product of Example 1, and 19.6 parts of chlorobenzene is heated to one hundred degrees for four hours. The mixture is cooled and filtered free of the salt. The organic layer is then washed three times with water and carefully freed of solvent under good vacuum. Distillation under a molecular still gave a yellow oil distilling at one hundred and seventy-five degrees at 0.001 millimeter.

EXAMPLE 6.—PREPARATION OF O,O-DIETHYL S - [4 - (4 - CHLOROPHENYLMERCAPTO)1,1-DIOXOTETRAHYDRO - 3 - THIENYL] PHOSPHOROTHIOATE

A solution of one part of sodium in fifty parts of absolute ethanol is treated with 6.3 parts of p-chlorothiophenol at room temperature. This solution is, in turn, added to a solution of fourteen parts of the products of Example 1 in fifty additional parts of ethanol at room temperature. The solution is allowed to stand overnight, after which the salt produced is removed by filtration. Removal of the solvent under reduced pressure affords an oil which is taken up in benzene and washed three times with water. Removal of the solvent gives an amber colored undistillable oil.

*Analysis.*—Calcd. for $C_{14}H_{20}ClO_5PS_3$: S, 22.3 percent. Found: S, 23.0 percent.

EXAMPLE 7.—PREPARATION OF 3-CHLORO-4- (4 - NITROPHENYLMERCAPTO)TETRAHYDROTHIOPHENE-1,1-DIOXIDE (a) *p - Nitrophenylsulfenyl chloride.* — Bis(p - nitrophenyl) disulfide (0.1 mole) is stirred with two hundred and forty moles of dry chloroform and treated with gaseous chloride (dried over sulfuric acid) until complete solution of the disulfide occurs. The solution is assayed by its ability to oxidize potassium iodide to free iodine.

The resulting compound is believed to be a new composition of matter having the structure:

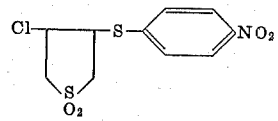

It is useful as an intermediate for organic synthesis, especially for the preparation of the pesticide of part (b) of this example. It may also be useful as an oil additive.

(b) *Addition of (a) to sulfolene.*—A mixture of 0.1 mole of sulfolene (2,5-dihydrothiophene-1,1-dioxide) and one hundred milliliters of dry chloroform was treated with 0.1 mole of the sulfenyl chloride produced in (a). The mixture is then heated under reflux overnight and allowed to cool. The product is filtered off and recrystallized from acetone and water (melting point one hundred and fifty-one degrees to one hundred and fifty-three degrees).

*Analysis.*—Calcd. for $C_{10}H_{10}ClNO_4S_2$: N, 4.6 percent; S, 20.7 percent. Found: N, 4.6 percent; S, 20.6 percent.

EXAMPLE 8.—PREPARATION OF O,O-DIETHYL-S-[4-(4-NITROPHENYLMERCAPTO) - 1,1 - DIOXOTETRAHYDRO - 3 - THIENYL] PHOSPHOROTHIOATE

A mixture of 1.5 parts of 3-chloro-4-(4-nitrophenylmercapto) tetrahydrothiophene-1,1-dioxide and sixty parts of dioxane were stirred and heated with one part of sodium diethyl phosphorothioate. After an eight-hour reflux period, the reaction mixture was cooled and freed of salt. Removal of the solvent under reduced pressure gives an undistillable oil which was taken up in benzene, washed thoroughly with water, and freed of solvent under good vacuum at fifty degrees.

*Analysis.*—Calcd. for $C_{14}H_{20}O_7 NPS_3$: N, 3.2 percent. Found: N, 3.0 percent.

EXAMPLE 9.—O,O-DIMETHYL S-(4-METHYLMERCAPTO-1,1-DIOXOTETRAHYDRO - 3 - THIENYL) PHOSPHOROTHIOATE

A mixture of 1.43 parts of 3-sulfolene in eighteen parts of chloroform is treated with one part of methanesulfenyl chloride prepared according to the method of Brintzinger et al., Chemische Berichte 83: 87 (1950). After standing for twenty-four hours at room temperature, the solution is reduced to dryness and treated with one hundred parts of dioxane in which is dissolved 1.99 parts of sodium O,O-dimethylphosphorothioate. The solution is heated under reflux for eight hours, cooled and then filtered free of the salt produced. The filtrate is evaporated and the residue is taken up in benzene and washed thoroughly with water. The benzene layer is dried over magnesium sulfate and then freed of solvent under good vacuum at fifty degrees to give a yellow oil identified by its infrared spectrum and analysis as the desired material.

*Analysis.*—Calcd. for $C_7H_{15}O_5PS_3$: P, 10.1 percent; S, 31.4 percent. Found: P, 10.2 percent; S, 31.2 percent.

EXAMPLE 10.—O,O-DIMETHYL S - (4 - METHYLMERCAPTO-1,1-DIOXOTETRAHYDRO-3 - THIENYL) PHOSPHORODITHIOATE

The method of Example 9 was used except that there was a substitution of 2.18 parts of the sodium salt of O,O-dimethyl phosphorodithioate for the 1.99 parts of the phosphorothioate.

The resultant yellow oil is identified as the desired material by its infrared spectrum and elemental analysis.

*Analysis.*—Calcd. for $C_7H_{15}O_4PS_4$: P, 9.6 percent; S, 39.8 percent. Found: P, 10.0 percent; S, 39.4 percent.

EXAMPLE 11.—O,O-DIETHYL S-(4-METHYLMERCAPTO-1,1-DIOXOTETRAHYDRO - 3 - THIENYL) PHOSPHORODITHIOATE

Prepared in the same manner as Example 9, but with the substitution of 2.52 parts of the sodium salt of O,O-diethylphosphorodithioate for the 1.99 parts of dimethylphosphorothioate. The product is a yellow oil whose infrared spectrum and elemental analysis confirm the structure of the compound.

*Analysis.*—Calcd. for $C_{11}H_{23}O_4PS_4$: P, 8.2 percent; S, 33.9 percent. Found: P, 8.5 percent; S, 33.7 percent.

*Formulations*

A typical emulsifiable concentrate made from the above toxicants would contain about 25% aryl alkyl sulfonates and polyoxyethylene sorbitan esters and an indifferent solvent such as xylene. The following is given for the purpose of illustration.

| | Parts |
|---|---|
| O,O-diethyl S-(4-ethylmercapto-1,1-dioxotetrahydro-3-thienyl)phosphorothioate | 40 |
| Atlox 3335 | 3 |
| Atlox 89108 | 1 |
| Xylene | 116 |

A typical formulation of a granule made from one of the above toxicants contain the carrier, toxicant and stabilizers:

| | Parts |
|---|---|
| O,O-diethyl S - (4-ethylmercapto-1,1-dioxotetrahydrothienyl)phosphorothioate | 2 |
| Urea (100 mesh) | 1 |
| Attaclay LVM (30/60 mesh) | 17 |

A typical seed coating made from one of the above toxicants contains a carrier such as carbon and a sticker such as methyl Cellosolve (trademark of Union Carbide Corp. for mono- and di-alkylethers of ethylene glycol, and their derivatives):

| | Parts |
|---|---|
| O,O-diethyl S-(4-ethylmercapto-1,1-dioxotetrahydro-3-thienyl) phosphorothioate | 1 |
| Darco G-60 | 3 |

Sticker solution of 2% aqueous methyl cellulose.

The seeds are wet with the above type of sticker solution and then the toxicant-carrier mixture is coated onto the seed.

*Contact tests*

*Housefly.*—Fifty adults of the CSMA (Chemical Specialties Manufacturers' Association) strain are sprayed in a two by five inch diameter stainless steel cage faced on top and bottom with fourteen mesh screen. Flies are retained in the cage in which they are sprayed for knockdown observations and twenty-four hour mortality determination. Mortality which results from this test may be from residual contact as well as by direct contact spray.

*Mexican bean beetle.*—Lima bean leaves sprayed on the dorsal and ventral surfaces are offered to ten larvae of the southern army worm (late third instar) and the Mexican bean beetle (late second instar), for a forty-eight hour feeding period. The feeding rate and mortality data are recorded.

*Pea aphids.*—Adult pea aphids are sprayed and transferred to sprayed pea plants and held for forty-eight hour mortality determination.

*Spider mite.*—Lima bean plants are infested with fifty to one hundred adults of the strawberry spider mite, *Tetranychus atlanticus,* prior to testing. The infested plants are dipped into the test material, removed, and held for five days. Adult mortality, as well as ovicidal action, is noted.

*Systemic tests*

Systemic insecticidal is evaluated by applying twenty moles of 0.01 percent concentration of the sample to the vermiculite substratum of potted pea plants. Twenty-four hours after application, the plants are infested with ten adult and mortality determination is made after five days.

*Method of formulation*

A general method of formulation for evaluation purposes consists of dissolving two parts of the toxicant in five parts of benzene and one part of Triton X–100 (an emulsifier and wetting agent). The solution is then dispersed in one hundred or more parts of water.

The contact and systemic activity of these valuable new materials is given in Tables I, II and III, where R, Q, and Z refer to the following structure:

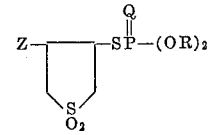

TABLE I.—PERCENT MORTALITY, CONTACT TEST AT 0.05 PERCENT AND 0.005 PERCENT CONCENTRATIONS

| INSECT | $R=C_2H_5$, $Q=S$ | | $R=C_2H_5$, $Q=O$ | | | |
|---|---|---|---|---|---|---|
| | $Z=H$ | | $Z=CH_3S$ | | $Z=C_2H_5S$ | |
| | 0.05% | 0.005% | 0.05% | 0.005% | 0.05% | 0.005% |
| Housefly (*Musca domestica*) | 0 | 0 | 0 | 0 | 98 | 14 |
| Mexican Bean Beetle (*Epilachna baribestis*) | 0 | 0 | 100 | 100 | 100 | 100 |
| Pea Aphid (*Macrosiphum pisi*) | 20 | 0 | 100 | 100 | 100 | 100 |
| Mite (*Tetranychus atlanticus*) | 0 | 0 | 99 | 92 | 100 | 100 |

TABLE II.—PERCENT MORTALITY, SYSTEMIC TEST AT 0.05 PERCENT AND 0.005 PERCENT CONCENTRATIONS

| Insect | $R=C_2H_5, Q=S$ | | $R=C_2H_5, Q=O$ | | | | $R=C_2H_5, Q=S$ | |
|---|---|---|---|---|---|---|---|---|
| | $Z=H$ | | $Z=CH_3S$ | | $Z=C_2H_5S$ | | $Z=CH_3S$ | |
| | 0.05% | 0.005% | 0.05% | 0.005% | 0.05% | 0.005% | 0.05% | 0.005% |
| Pea Aphid (*Macrosiphum pisi*) | 0 | 0 | 100 | 70 | 100 | 100 | 100 | 80 |
| Spider Mite (*Tetranychus atlanticus*) | 0 | 0 | 85 | 0 | 100 | 100 | 100 | 90 |

TABLE III.—PERCENT MORTALITY, SYSTEMIC TEST AT 0.05 PERCENT AND 0.005 PERCENT CONCENTRATIONS

| | $R=CH_3, Z=CH_3S$ | | | |
|---|---|---|---|---|
| | $Q=O$ | | $Q=S$ | |
| | 0.05% | 0.005% | 0.05% | 0.005% |
| Pea Aphid (*Macrosiphum pisi*) | 100 | 80 | 100 | 90 |
| Spider Mite (*Tetranychus atlanticus*) | 100 | 90 | 100 | 90 |

While I have given specific illustrations of compositions, intermediates therefor, processes for making these materials, and of certain uses therefor in this specification, it is to be understood that various other modifications can be made by one of ordinary skill in this art without departing from the scope of my invention and I do not want to be limited to same, except as defined in the appended claims.

What is claimed is:

1. A method for controlling a pest selected from the group consisting of insects and worms which comprises applying to the locus of said pests a compound of the formula

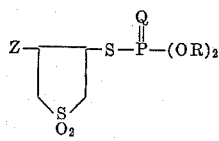

wherein the R's are alkyl of 1 to 8 carbon atoms, which may be the same or different, Q is selected from the group consisting of oxygen and sulfur and Z is selected from the group consisting of alkylmercapto of one to eight carbon atoms, chlorine-substituted alkylmercapto, phenylmercapto, chlorine-substituted phenylmercapto, nitro-substituted phenylmercapto, alkoxy of one to eight carbon atoms, phenoxy, chlorine-substituted phenoxy and nitro-substituted phenoxy.

2. A method according to claim 1 wherein the compound is applied to a locus of insects.

3. A method according to claim 2 wherein the compound is applied in the vicinity of plants, by which it is absorbed.

4. A method according to claim 2 wherein the compound is applied to seeds prior to planting thereof.

5. A method according to claim 2 wherein the compound is sprayed as an aqueous emulsion onto the locus to be treated.

6. A method according to claim 2 wherein the compound is applied to the locus to be treated together with a carrier therefor.

7. A composition for the control of insects and worms comprising a compound of the formula

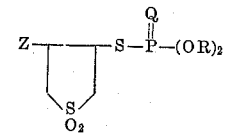

wherein the R's are alkyl of 1 to 8 carbon atoms, which may be the same or different, Q is selected from the group consisting of oxygen and sulfur and Z is selected from the group consisting of alkylmercapto of one to eight carbon atoms, chlorine-substituted alkylmercapto, phenylmercapto, chlorine-substituted phenylmercapto, nitro-substituted phenylmercapto, alkoxy of one to eight carbon atoms, phenoxy, chlorine-substituted phenoxy and nitro-substituted phenoxy, and a carrier therefor.

8. A pesticidal composition according to claim 7 wherein the carrier is water and

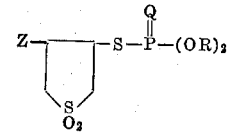

is emulsified therein by means of a chemical emulsifying agent.

No references cited.

ALBERT T. MEYERS, *Primary Examiner.*

GEORGE A. MENTIS, *Assistant Examiner.*

UNITED STATES PATENT OFFICE
CERTIFICATE OF CORRECTION

Patent No. 3,341,407

September 12, 1967

Sheldon B. Greenbaum

It is hereby certified that error appears in the above numbered patent requiring correction and that the said Letters Patent should read as corrected below.

Column 2, line 18, for "insect" as" read -- "insect" as --; line 26, for "orthropods" read -- arthropods --; same line 26, strike out "or"; column 3, line 8, for "designed" read -- designated --; line 11, for "diarysulfones" read -- diarylsulfones --; line 32, for "dileunts" read -- diluents --; column 4, line 52, for "process" read -- processes --; line 58, for "aliphaitc" read -- aliphatic --; line 62, for "PHOSPHIROTHIOATE" read -- PHOSPHOROTHIOATE --; column 6, line 31, for "chloride" read -- chlorine --; column 7, lines 38 and 39, strike out "Analysis.-Calcd. for $C_{11}H_{23}O_4PS_4$: P, 8.2 percent; S, 33.9 percent. Found: P, 8.5 percent; S, 33.7 percent."; column 8, line 40, after "insecticidal" insert -- activity --; line 44, for "adult" read -- adults --.

Signed and sealed this 26th day of November 1968.

(SEAL)
Attest:

EDWARD M. FLETCHER, JR.
Attesting Officer

EDWARD J. BRENNER
Commissioner of Patents